(12) United States Patent
Ramaekers et al.

(10) Patent No.: US 11,518,090 B2
(45) Date of Patent: Dec. 6, 2022

(54) METHOD FOR MANUFACTURING AN OBJECT BY MEANS OF ADDITIVE MANUFACTURING USING A PLURALITY OF SOLIDIFYING DEVICES

(71) Applicant: ADDITIVE INDUSTRIES B.V., Eindhoven (NL)

(72) Inventors: Michiel Daniel Ramaekers, Eindhoven (NL); Frank Eugenius Barbara Ophelders, Eindhoven (NL); Sandra Susan Poelsma, Eindhoven (NL); Mark Herman Else Vaes, Eindhoven (NL)

(73) Assignee: ADDITIVE INDUSTRIES B.V., Eindhoven (NL)

( * ) Notice: Subject to any disclaimer, the term of this patent is extended or adjusted under 35 U.S.C. 154(b) by 210 days.

(21) Appl. No.: 16/753,160

(22) PCT Filed: Nov. 2, 2018

(86) PCT No.: PCT/NL2018/050733
§ 371 (c)(1),
(2) Date: Apr. 2, 2020

(87) PCT Pub. No.: WO2019/093883
PCT Pub. Date: May 16, 2019

(65) Prior Publication Data
US 2020/0269498 A1      Aug. 27, 2020

(30) Foreign Application Priority Data

Nov. 13, 2017 (NL) ..................... 2019900

(51) Int. Cl.
*B29C 67/00* (2017.01)
*B29C 64/153* (2017.01)
(Continued)

(52) U.S. Cl.
CPC .......... *B29C 64/153* (2017.08); *B29C 64/245* (2017.08); *B29C 64/282* (2017.08);
(Continued)

(58) Field of Classification Search
CPC ... B29C 64/153; B29C 64/282; B29C 64/245; B29C 64/393; B33Y 10/00; B33Y 30/00; B33Y 50/00; B33Y 50/02
See application file for complete search history.

(56) References Cited

FOREIGN PATENT DOCUMENTS

| | | |
|---|---|---|
| DE | 10 2016 112 652 A1 | 1/2017 |
| EP | 2 431 113 A1 | 3/2012 |
| WO | 2014/199134 A1 | 12/2014 |

OTHER PUBLICATIONS

International Search Report for International Application No. PCT/NL2018/050733 dated Feb. 27, 2019.

*Primary Examiner* — Ryan M Ochylski
(74) *Attorney, Agent, or Firm* — Suiter Swantz pc llo (57) ABSTRACT

The invention relates to a method for manufacturing an object from a material by means of additive manufacturing using a plurality of solidifying devices for solidifying said material in stacked layers by means of electromagnetic radiation. Said method comprises the step of defining, by a data processing unit, at least two solidifying device allocations. In each of said solidifying device allocations said plurality of solidifying devices are allocated to respective parts of said layer such that said parts cover said layer. The method further comprises calculating, by said data processing unit, for each of said at least two solidifying device allocations, respective allocated part manufacturing times representing times for each of said plurality of solidifying devices for solidifying said respective allocated part of said layer, wherein said calculating takes into account an expected disturbance area from solidifying said material by one of said plurality of solidifying devices, wherein said
(Continued)

disturbance area relates to at least an expected fume above said layer. The data processing unit then determines the manufacturing throughput time, and selects a definite allocation.

15 Claims, 4 Drawing Sheets (51) Int. Cl.
*B29C 64/282* (2017.01)
*B29C 64/245* (2017.01)
*B29C 64/393* (2017.01)
*B33Y 10/00* (2015.01)
*B33Y 30/00* (2015.01)
*B33Y 50/02* (2015.01)
*B29C 64/268* (2017.01)

(52) U.S. Cl.
CPC .......... *B29C 64/393* (2017.08); *B29C 64/268* (2017.08); *B33Y 10/00* (2014.12); *B33Y 30/00* (2014.12); *B33Y 50/02* (2014.12)

METHOD FOR MANUFACTURING AN OBJECT BY MEANS OF ADDITIVE MANUFACTURING USING A PLURALITY OF SOLIDIFYING DEVICES

TECHNICAL FIELD AND BACKGROUND

The invention relates to a method for producing an object by means of additive manufacturing, in particular with an apparatus comprising a process chamber for receiving a bath of material which can be solidified by exposure to electromagnetic radiation; a support for positioning the object in relation to the surface level of the bath of material; and a solidifying device for solidifying a layer of the material on the surface level by means of electromagnetic radiation.

3D printing or additive manufacturing refers to any of various processes for manufacturing a three-dimensional object. Traditional techniques like injection molding can be less expensive for manufacturing, for example, polymer products in high quantities, but 3D printing or additive manufacturing can be faster, more flexible and less expensive when producing relatively small quantities of three-dimensional objects.

It is anticipated that additive manufacturing becomes more and more important in the future, as the increasing competitive pressure forces companies to not only manufacture more economically with a constant high product quality but also to save time and costs in the area of product development. The life span of products is continuously shortened. In addition to product quality and product costs, the moment of market introduction is becoming increasingly important for the success of a product.

The three-dimensional object may be produced by selectively solidifying, in a layer-like fashion, a powder, paper or sheet material to produce a three-dimensional, 3D, object. In particular, a computer controlled additive manufacturing apparatus may be used which sequentially sinters a plurality of layers to build the desired object in a layer-by-layer fashion. Primarily additive processes are used, in which successive layers of material are laid down under computer control. These objects can be of almost any shape or geometry, and are produced from a 3D model or other electronic data source.

In order to print a three-dimensional object, a printable model is to be created with a computer design package or via a 3D scanner, for example. Usually, the input is a 3D CAD file such as an STL file, a STEP file or a IGS file. Before printing the object from a CAD file, the file is to be processed by a piece of software, which converts the model into a series of thin subsequent layers. Further, apparatus settings and vectors are generated for controlling the creation of each of the subsequent layers.

A laser comprised in the computer controlled additive manufacturing apparatus follows these settings and vectors to solidify successive layers of material to built the 3D object from a series of cross sections. These layers, which correspond to the virtual cross sections from the CAD model, are during this process joined or fused at the same time to create the final 3D object.

One of the challenges in the manufacturing of three dimensional objects, in particular in additive manufacturing of metal objects, is how to effectively process the CAD file into a series of thin subsequent layers, and how to effectively generate the apparatus settings and vectors for controlling the creation of said subsequent layers when a plurality of solidifying devices are to be used during the additive manufacturing process.

To this end, the invention provides an improved method for manufacturing an object from a material by means of additive manufacturing using a plurality of solidifying devices for solidifying said material in stacked layers.

BRIEF SUMMARY

According to the invention, the method comprises the steps of defining, by a data processing unit, at least two solidifying device allocations, wherein in each of said solidifying device allocations said plurality of solidifying devices are allocated to respective parts of said layer such that said parts cover said layer, wherein said at least two solidifying device allocations are substantially mutually different;

calculating, by said data processing unit, for each of said at least two solidifying device allocations, respective allocated part manufacturing times representing times for each of said plurality of solidifying devices for solidifying said respective allocated part of said layer, wherein said calculating takes into account an expected disturbance area from solidifying said material by one of said plurality of solidifying devices, wherein said disturbance area relates to at least an expected fume and/or splashes above said layer;

determining, by said data processing unit, for each of said at least two solidifying device allocations, the respective layer manufacturing throughput time for said layer, wherein a respective layer manufacturing throughput time equals the longest of said calculated allocated part manufacturing times for said layer;

selecting, by said data processing unit, a definite allocation of said plurality of solidifying devices based on said determined layer manufacturing throughput times, and using said definite allocation for manufacturing said layer with said plurality of solidifying devices.

Thus, according to the invention, the method defines at least two mutually different solidifying allocations. In a first solidifying allocation the plurality of solidifying devices are each assigned to parts of said layer for manufacturing said layer. In at least a second solidifying allocation the plurality of solidifying devices are also each assigned to parts of said layer for manufacturing said layer. However, the assignment of parts of the first solidifying allocation differs from the assignment of parts of the second solidifying allocation.

In a subsequent step, said data processing unit calculates, for each of said at least two solidifying device allocations, respective allocated part manufacturing times representing times for each of said plurality of solidifying devices for solidifying said respective allocated part of said layer. Thus, the time required for manufacturing said layer, for each of the solidifying device allocations, is calculated. Said calculating takes into account an expected disturbance area from solidifying said material by one of said plurality of solidifying devices, wherein said disturbance area relates to at least an expected fume and/or splashes above said layer. The fume is related, for example, to evaporation of the material used during additive manufacturing. Splashes relate, for example, to spatter of material and ejected powder at the location of the interaction zone between the electromagnetic radiation and the powdered material. Inclusion of splashes in the final product is undesirable, as it leads to material defects. It is observed that these splashes do not land far from the electromagnetic radiation, and furthermore the direction these splashes go to can be predicted by a computer model and be accounted for by the data processing unit.

In a subsequent step, said data processing unit determines, for each of said at least two solidifying device allocations, the respective layer manufacturing throughput time for said layer. This corresponds to the longest time that one of the plurality of solidifying devices requires for finishing its job. With this it is in particular meant the longest time required for each of the solidifying devices to complete their job, including active time (solidifying) and inactive time (waiting time). This longest time determines how long it takes to finish the respective layer.

Finally, the method according to the invention requires that said data processing unit selects a definite allocation of said plurality of solidifying devices based on said determined layer manufacturing throughput times, and using said definite allocation for manufacturing said layer with said plurality of solidifying devices. This means that normally the subsequent layer manufacturing throughput times are compared to each other, and that the shortest time is selected as the definite allocation. However, said selecting may include a selection based on other and/or further criteria as well. For example, selection may be based on an optimization including manufacturing time, fume interaction, and/or splashes interaction. Ultimately, in an additive manufacturing process it is very hard to meet all boundary conditions, and this means optimization may allow some negative effects to occur (for example longer manufacturing time) in case this prevents other undesired effects (e.g. fume and/or splashes). This means that not always the shortest manufacturing throughput time needs to be selected as the definite allocation.

With the method according to the invention, processing and generating apparatus settings and vectors for controlling the creation of subsequent layers with a plurality of solidifying devices is improved and optimized, due to the generation of multiple allocations and due to the fact that fume generation during the additive manufacturing is accounted for. This improves the effectivity and speed of the manufacturing process, with which the object of the invention is achieved.

Advantageous embodiments of the method will be explained below.

In an embodiment the method comprises the step of optimizing, by said data processing unit, said layer manufacturing throughput time by repeating, at least once, said steps of defining, calculating and determining, wherein in said repeated defining step information obtained in said determining step is used. Thus, information about a first definition, and the resulting calculated throughput time, may be used to define further solidifying device allocations. This way, information relating to a solidifying device allocation having a relatively short manufacturing throughput time may be used to define a new solidifying device allocation, with the aim for further reducing said manufacturing throughput time.

The step of optimizing may comprise the step of combining information relating to at least two determined manufacturing throughput times. This means for example that information of a first solidifying device allocation may be combined with information from a second solidifying device allocation. In an embodiment, the allocation of the solidifying devices relating to said two manufacturing throughput times may be combined to define a new solidifying device allocation, and subsequently the respective manufacturing throughput time may be calculated and determined. In case this leads to an improvement of the manufacturing throughput time, a further optimizing step may be performed. Otherwise, a new optimizing step may be performed by combining different information.

Said information may comprise information relating to at least one of the shortest layer manufacturing throughput times. It is envisaged that by combining information relating to the shortest layer manufacturing throughput time, a further improvement (i.e. decrease) in the manufacturing throughput time is obtained. However, due to the complexity of the additive manufacturing process, and the parameters involved therein, this is not necessarily the case.

Optimization may be done until a desired threshold value is obtained. However, it is not certain that the optimization steps lead to a converging solution. In fact, the optimization step may lead to a solution that is worse with respect to manufacturing throughput time (i.e. longer manufacturing time). Of course, infinite numbers of definitions and calculations may lead to an optimal solution, but this is not profitable.

To further minimize the required number of calculations, and to further increase the optimization process, the following steps may be performed. The method may comprise the step of assigning the determined layer manufacturing throughput times in at least two groups, and combining information relating to at least one of the shortest layer manufacturing throughput times in one of said at least two groups, with information relating to at least one of the shortest layer manufacturing throughput times in another one of said at least two groups. The assignment into at least two groups may be performed at random, i.e. groups are formed by randomly assigning each of the determined manufacturing throughput times to one of the groups. Then for each group, the manufacturing throughput times are sorted and one of the (or the) shortest throughput times is selected. Then, information relating to the selected throughput time of a first group is combined with information relating to the selected throughput time of a second group. The information in particular comprises the allocation of the solidifying devices to different parts.

In an embodiment said information may comprise information relating to at least the respective solidifying device allocation, i.e. the allocation of respective parts for each of the solidifying devices.

Said plurality of solidifying devices may be arranged for emitting a beam of electromagnetic radiation. During said step of calculation allocated part manufacturing times, said calculating may take into account at least one of:

a wavelength of said beam of electromagnetic radiation;
a geometry of said beam of electromagnetic radiation at said layer;
a power level of said beam of electromagnetic radiation;
a velocity of said beam of electromagnetic radiation along said layer.

In an embodiment, during said step of allocating, said parts of said layer are at least partly overlapping. It is conceivable that different solidifying devices are used to solidify at least overlapping parts of the object to be manufactured.

During said step of allocating, said layer may at least be divided into a contour part comprising a contour of said layer corresponding to an outer layer of said manufactured object and a fill part.

The method steps of defining allocations, calculating, determining and selecting may be executed for at least two layers of said stacked layers, preferably for each layer of said stacked layers.

According to an aspect, the invention provides a data processing unit that is arranged and configured to execute the method according to the invention, according to one or more embodiments thereof as described above.

According to an aspect, an apparatus for producing an object by means of additive manufacturing using the method according to the invention is provided, wherein said apparatus comprises:

a process chamber for receiving on a build surface of a build plate a bath of said material;

a support for positioning said build plate in relation to a surface level of said bath of said material in said process chamber;

a plurality of solidifying devices arranged for delivering a plurality of beams of electromagnetic radiation for solidifying said material; and a data processing unit as described above.

Advantages of such an apparatus, incorporating said data processing unit for executing the method according to the invention have been described above.

BRIEF DESCRIPTION OF THE DRAWINGS

The invention will next be explained by means of the accompanying figures. In the figures.

DETAILED DESCRIPTION

Figure 1:
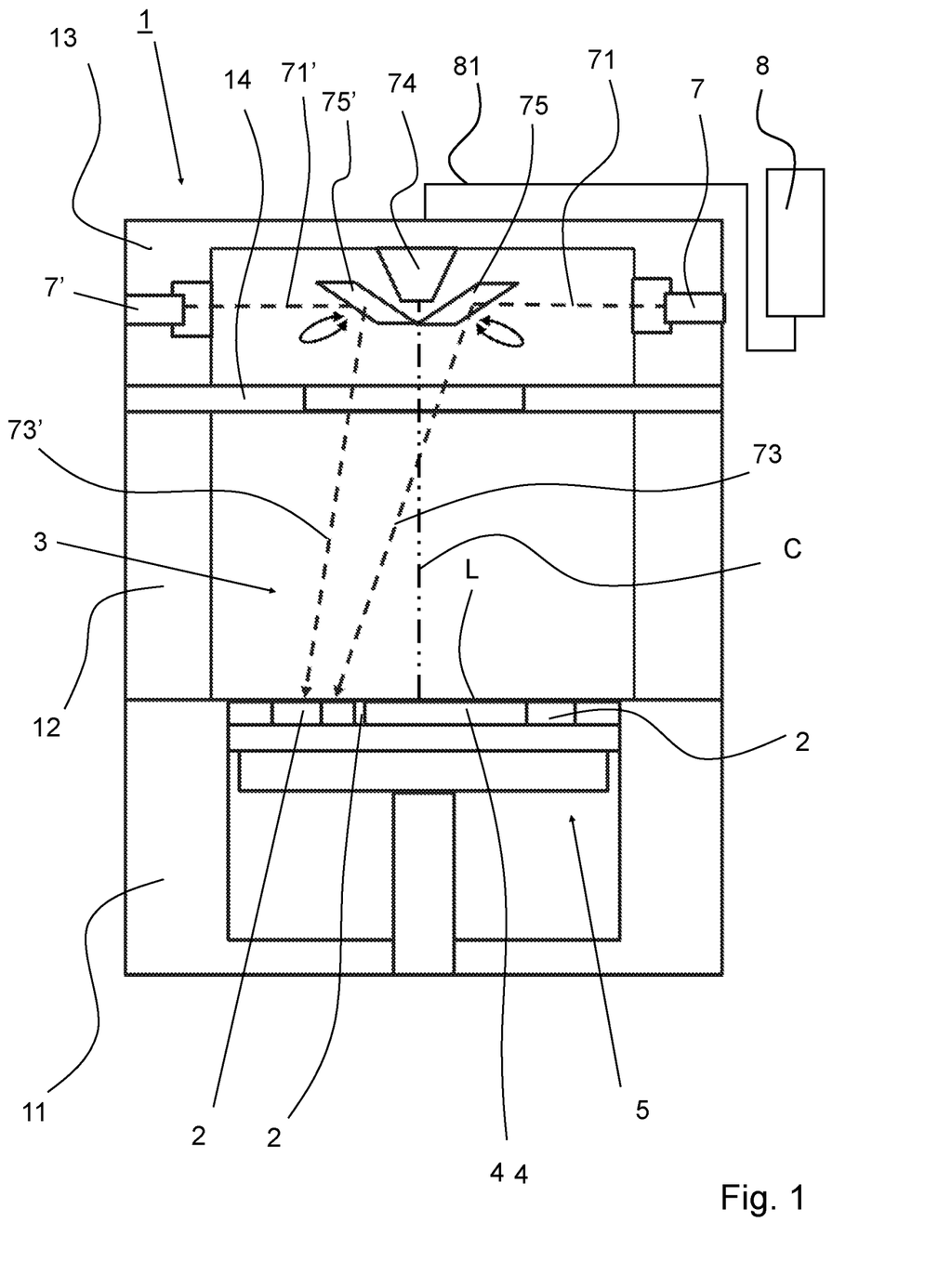
FIG. 1—shows a schematic overview of an apparatus according to the invention, arranged for producing an object by means of additive manufacturing.

FIG. 1 shows an overview of an apparatus 1 for producing an object 2 by means of additive manufacturing. The apparatus 1 is build from several frame parts 11, 12, 13. The apparatus comprises a process chamber 3 for receiving a bath of material 4 which can be solidified. In a lower frame part 11, a shaft is formed, wherein a support comprising a build plate 5 is provided for positioning the object 2 (or even objects) in relation to the surface level L of the bath of material 4. The support 5 is movably provided in the shaft, such that after solidifying a layer, the support 5 may be lowered, and a further layer of material may be solidified on top of the part of the object 2 already formed. In a top part 13 of the apparatus 1, a number of solidifying devices 7. 7' are provided for respectively solidifying a selective part of the material. In the embodiment shown, the solidifying devices 7 are laser devices, arranged for producing electromagnetic radiation, for example in the form of laser light, in order to melt a powdered material provided on the support, which then, after cooling forms a solidified part of the object to be produced. As can be seen, the electromagnetic radiation 71. 71' emitted by the laser devices 7, 7' is deflected by means of a deflector unit 74, which uses a number of rotatable optical elements 75, 75' to respectively direct the emitted radiation 71, 71' towards the surface L of the layer of material 4.

The apparatus 1 may further comprise a recoating device (not shown) which can be displaced along the surface L of the bath for levelling the surface L of the bath of material 4. Such a recoating device is known per se to those skilled in the art.

Summarized, as FIG. 1 shows, the apparatus 1 for producing an object 2 by means of additive manufacturing comprises a first solidifying device 7 that is provided for solidifying a selective part of the material by means of electromagnetic radiation. The top part 13 of the apparatus 1 also comprises a further solidifying device 7 for solidifying a selective part of the material by means of electromagnetic radiation. The electromagnetic radiation 71' emitted by the further laser device 7' is deflected by means of a further rotatable deflector unit 75' to direct the emitted radiation 71' thereof towards the surface L of the layer of material 4.

It can be seen furthermore in FIG. 1, that in the embodiment shown the plurality of deflector means 75, 75' are positioned near a line C perpendicular to the plane defined by the object working area L, and which line C passes through geometrical centre of gravity of the object working area L. In other words, the deflector means 75, 75' are substantially provided above a centre part of the object working area L. This allows each of the plurality of solidifying devices to easily reach substantially the entire object working area, such that, for instance, simultaneous solidifying of different parts of a single object may occur.

The apparatus 1 according to the invention also comprises a data processing unit 8, which is connected or connectable to the apparatus 1, and whose function will be explained below with respect to the method according to the invention. As a general remark, said data processing unit 8 may for example be a stand alone computer, and the manufacturing data resulting from said processing unit 8 may be delivered to the apparatus 1, for example by means of a data carrier such as a USB storage device, or even via a wireless connection. It is therefore not necessary that the data processing unit is directly connected to the apparatus, as long as information resulting from the processing unit 8 can be delivered to the apparatus 1.

First referring to FIG. 2, however, one of the challenges occurring during the process of manufacturing an object from a material by means of additive manufacturing using a plurality of solidifying devices for solidifying said material in stacked layers will be explained.

Figure 2:
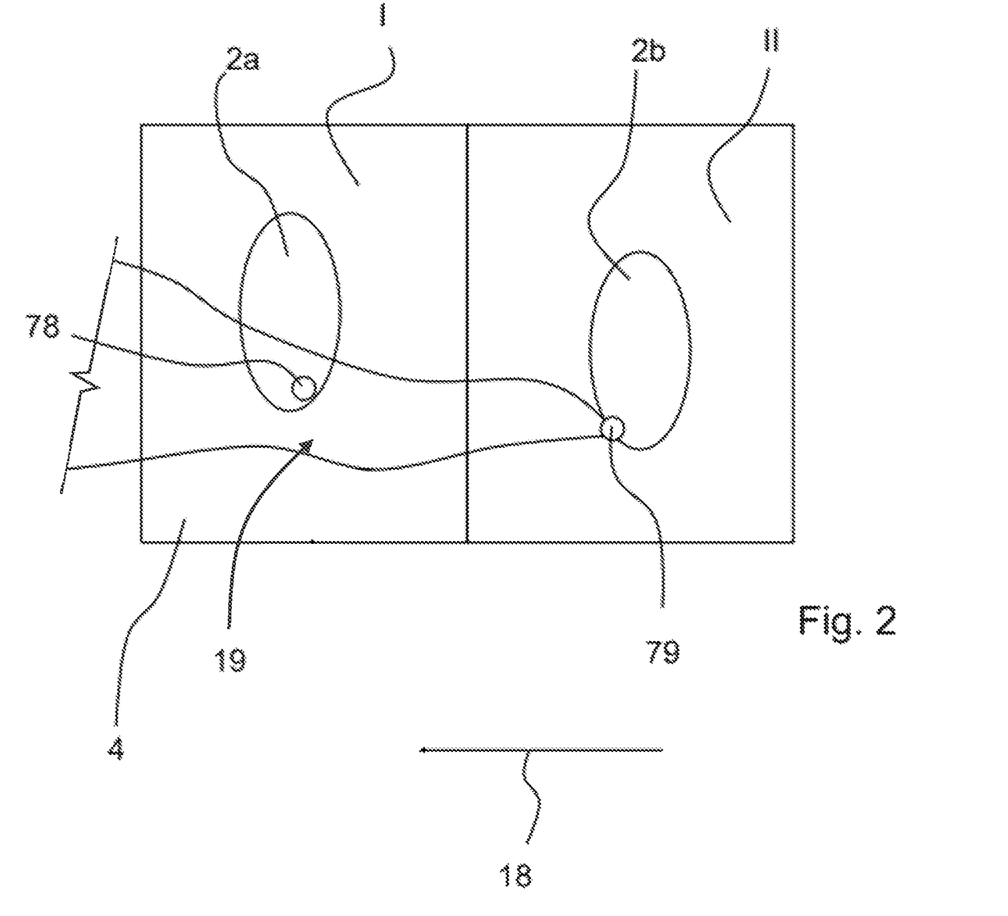
FIG. 2—shows a top view of a manufacturing process using two solidifying devices.

FIG. 2 shows a top view of a layer of material 4 on top of a build plate 5, where two spots 78, 79 of electromagnetic radiation (for example from solidifying devices 7, 7') are used simultaneously to manufacture separate objects 2a, 2b in a single layer. The layer is divided into two subparts I, II; wherein each solidifying device is assigned to a separate subpart I, II.

A process gas flow 18 is used, and it has in general two purposes, namely prevention of oxidation and removal of splashes and metal condensate from the laser/powder interaction zone.

As can be seen in FIG. 2, depending on the alignment of the scanning fields of the spots 78, 79, the upstream system (subpart II) can influence the part quality of the downstream system (subpart I), for example in that a fume 19 resulting from spot 79 moves directly over spot 78. This is undesirable.

The presence of these fumes, and other disturbances, as well as the various boundary conditions that need to be respected in order to obtain the required quality, provide a mayor challenge in determining a strategy for assigning laser devices to different parts. With this, it is difficult to optimize the manufacturing process, in particular when a large number of solidifying devices are used. The solidifying devices are relatively expensive, and thus idle time of the solidifying devices need to be minimized to improve the cost effectiveness of the apparatus.

Figure 3:
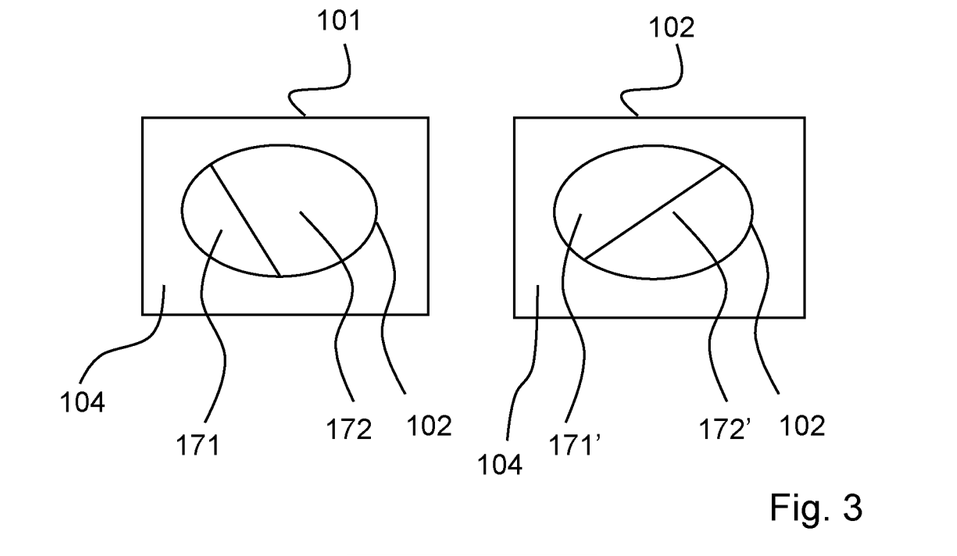
FIG. 3—shows an example of two mutually different solidifying device allocations defined according to the method.
Figure 4:
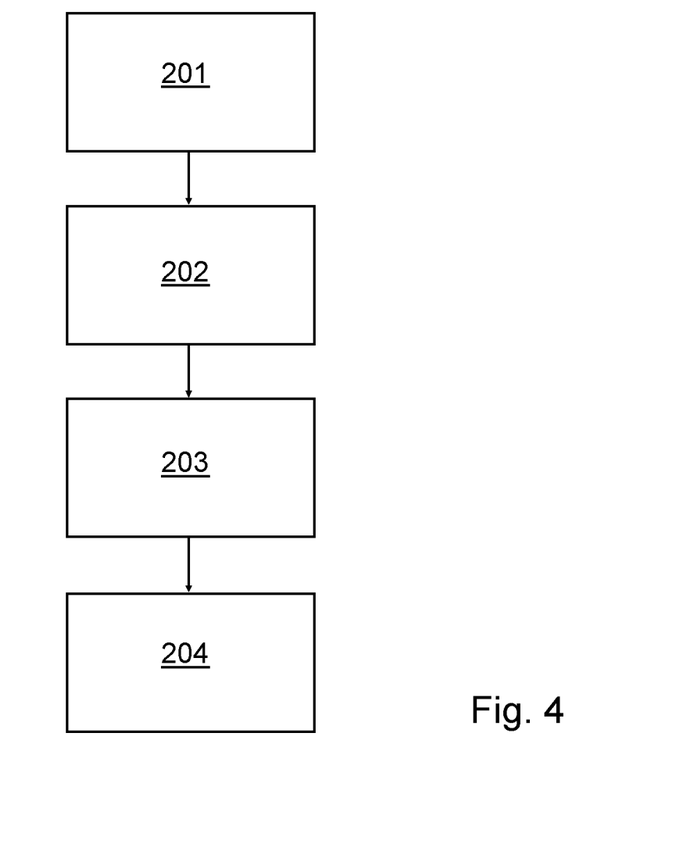
FIG. 4—schematically shows the steps in the method according to the invention.

To this end, the invention provides a method for manufacturing an object 2 from a material 4 by means of additive manufacturing using a plurality of solidifying devices 7, 7' for solidifying said material 4 in stacked layers by means of electromagnetic radiation 73, 73'. Now referring to FIG. 3 and FIG. 4, it will be seen that said method comprises the steps of:

defining 201, by a data processing unit 8, at least two solidifying device allocations 101, 102 (FIG. 3). In each of said solidifying device allocations 101, 102 said plurality of solidifying devices are allocated to respective parts 171, 172 of said layer 104 such that said parts cover said layer 104 for manufacturing said object 102. From FIG. 3 (left side) it can be seen that a first allocation 101 is provided, wherein a lower left part 171 of said object 102 is assigned to a first solidifying device, and a upper right part 172 of said object 102 is assigned to a second solidifying device. In FIG. 3 (right side) it can be seen that the allocations 171', 172' to respective parts are chosen to be different: now an upper left part 171' is assigned to the first solidifying device, and a lower right part 172' is assigned to the second solidifying device.

The assignment of respective parts may be done at random, at least initially. An educated guess may be used as an initial assignment as well. As will be explained below, an iterative procedure may also be used. Not shown in FIG. 3, but part of the invention, is that the assignment may also include that said parts 171, 172 of said layer 104 are at least partly overlapping. Also not shown, but part of the invention, is that said layer 104 may be divided into a contour part comprising a contour of said layer 104 corresponding to an outer layer of said manufactured object 102 and a fill part.

In any event, the method comprises the step of defining allocations 101, 102, wherein said at least two solidifying device allocations 101, 102 are substantially mutually different.

According to the method, said data processing unit 8 calculates 202, for each of said at least two solidifying device allocations 101, 102, respective allocated part manufacturing times representing times for each of said plurality of solidifying devices 7, 7' for solidifying said respective allocated part 171, 172; 171', 172' of said layer, wherein said calculating takes into account an expected disturbance area 19 (see FIG. 2) from solidifying said material by one of said plurality of solidifying devices 7, 7', wherein said disturbance area relates to at least an expected fume 19 above said layer 104.

Thus, for allocation 101 (left part of FIG. 3), the time it takes to manufacture object part 171 is calculated 202, and the time it takes to manufacture object part 172 is calculated. Additionally, for allocation 102 (right part of FIG. 3), the time it takes to manufacture object part 171' is calculated, and the time it takes to manufacture object part 172' is calculated.

Once the manufacturing times are calculated 202, the data processing unit 11 determines 203, for each of said at least two solidifying device allocations 101, 102, the respective layer manufacturing throughput time for said layer 104, wherein a respective layer manufacturing throughput time equals the longest of said calculated allocated part manufacturing times for said layer 104.

For example, in FIG. 3 (left hand side) it can be seen that part 172 is relatively large, and that part 171 is relatively small. It is therefore expected that the manufacturing time for the allocated part 172 is longer than the manufacturing time for the allocated part 171, meaning that the idle time for the solidifying device associated with allocated part 171 is higher. In FIG. 3 (right hand side), the allocated parts 171' and 172' are relatively equal in size to each other. Thus the manufacturing time for the allocated parts 171' and 172' is roughly equal to each other (in this example disregarding any disturbances, such as an expected fume). From FIG. 3, it will be expected that allocation 101 takes the longest time (due to the large part allocation 172), and hence that allocation 102 is an allocation that takes the shortest time to manufacture.

Once determined 203, said data processing unit 8 may select a definite allocation 102 of said plurality of solidifying devices 7, 7' based on said determined layer manufacturing throughput times. This definite allocation 102 is then used by the apparatus 1 for manufacturing said layer 104 with said plurality of solidifying devices 7, 7'.

Figure 5:
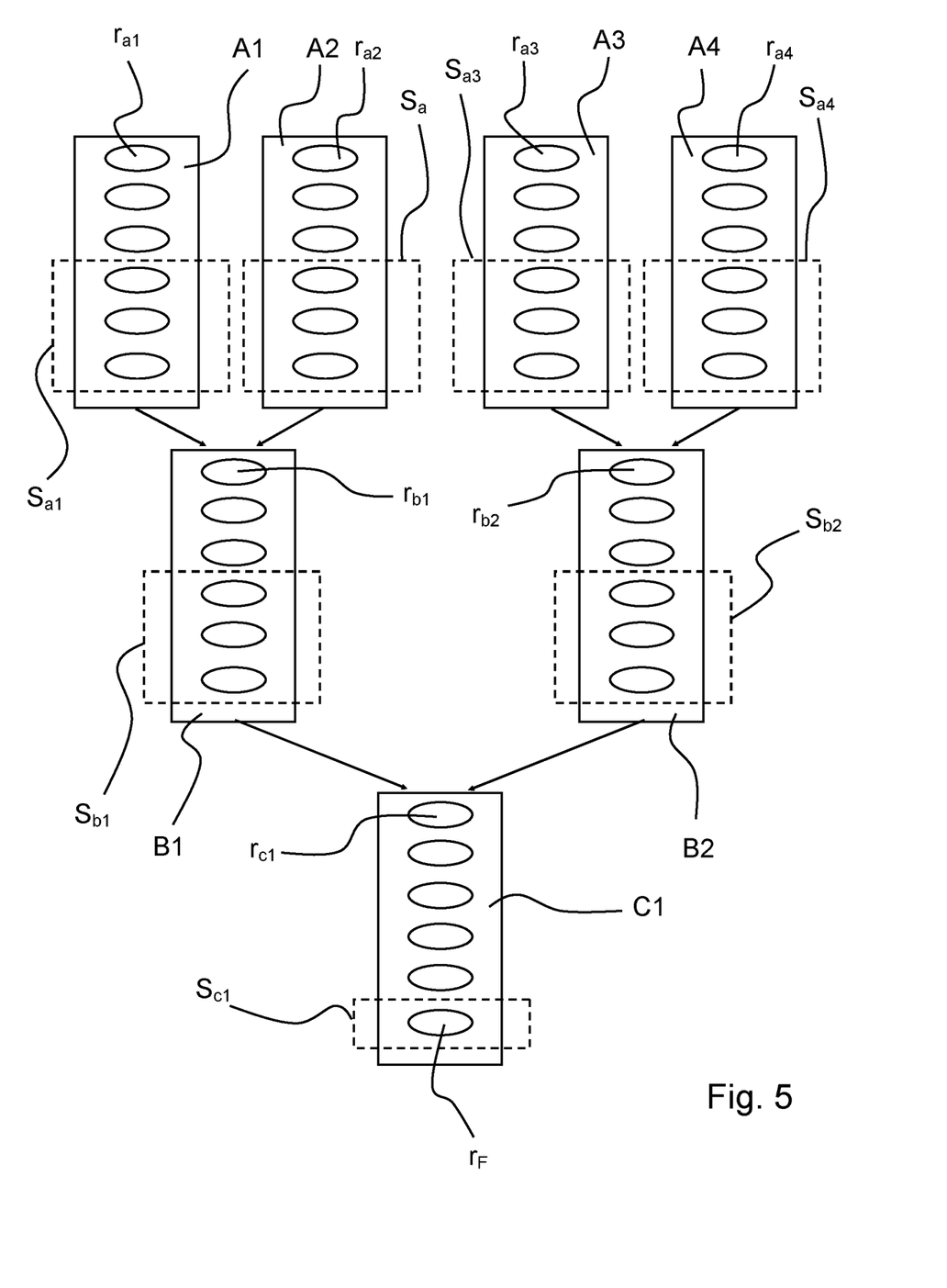
FIG. 5—schematically shows an extended process of the method.

As shown in FIG. 5, an optimizing step may be performed. This may be done by repeating, at least once, said steps of defining 201, calculating 202 and determining 203, wherein in said repeated defining 201 step information obtained in said determining 203 step is used.

In FIG. 5 a total of twenty four allocations $r_{a1}$-$r_{a4}$ are defined 201, and the resulting throughput times are calculated 202. Then, the twenty four allocations $r_{a1}$-$r_{a4}$ are grouped into four distinctive groups A1-A4, which may be done at random, or in any other way. Then, for each group A1-A4, the best three allocations $r_{a1}$-$r_{a4}$ are selected (i.e. shortest manufacturing times). Information relating to these allocations from one group is then combined with information relating to these allocations from another group. In FIG. 5, it can be seen that information from group A1 and information from group A2 is combined to define further allocations in group B1. Likewise, information from group A3 and information from group A4 is combined to define further allocations in group B2. This step of optimizing thus comprises the step of combining information relating to at least two determined manufacturing throughput times, in particular information relating to at least one of the shortest layer manufacturing throughput times.

Then, the above described process is repeated in group B1 and B2, to define a further group C1 of allocations. Finally, the best manufacturing throughput time $r_F$ is determined 203 and selected 204 to be used by the apparatus.

During said step of calculating 202 allocated part manufacturing times, said calculating takes into account at least one of:
- a wavelength of said beam of electromagnetic radiation;
- a geometry of said beam of electromagnetic radiation at said layer;
- a power level of said beam of electromagnetic radiation;
- a velocity of said beam of electromagnetic radiation along said layer.

The method as described above may at least partly be repeated for each layer. In that case the method steps of defining allocations, calculating, determining and selecting are executed for at least two layers of said stacked layers, preferably for each layer of said stacked layers.

The desired protection is defined in the appended claims.

The invention claimed is:

1. A method for manufacturing an object from a material by means of additive manufacturing using a plurality of solidifying devices for solidifying said material in stacked layers by means of electromagnetic radiation, said method comprising the steps of:

defining, by a data processing unit, at least two solidifying device allocations, wherein in each of said solidifying device allocations said plurality of solidifying devices are allocated to respective parts of said layer such that said parts cover said layer, wherein said at least two solidifying device allocations are substantially mutually different;

calculating, by said data processing unit, for each of said at least two solidifying device allocations, respective allocated part manufacturing times representing times for each of said plurality of solidifying devices for solidifying said respective allocated part of said layer, wherein said calculating takes into account an expected disturbance area from solidifying said material by one of said plurality of solidifying devices, wherein said disturbance area relates to at least an expected fume and/or splashes above said layer;

determining, by said data processing unit, for each of said at least two solidifying device allocations, the respective layer manufacturing throughput time for said layer, wherein a respective layer manufacturing throughput time equals the longest of said calculated allocated part manufacturing times for said layer; and selecting, by said data processing unit, a definite allocation of said plurality of solidifying devices based on said determined layer manufacturing throughput times, and using said definite allocation for manufacturing said layer with said plurality of solidifying devices.

2. The method according to claim 1, wherein the method comprises the step of optimizing, by said data processing unit, said layer manufacturing throughput time by repeating, at least once, said steps of defining, calculating and determining, wherein in said repeated defining step information obtained in said determining step is used.

3. The method according to claim 2, wherein the step of optimizing comprises the step of combining information relating to at least two determined layer manufacturing throughput times.

4. The method according to claim 2, wherein said information comprises information relating to at least one of the shortest layer manufacturing throughput times.

5. The method according to claim 2, comprising the step of assigning the determined layer manufacturing throughput times in at least two groups, and combining information relating to at least one of the shortest layer manufacturing throughput times in one of said at least two groups, with information relating to at least one of the shortest layer manufacturing throughput times in another one of said at least two groups.

6. The method according to claim 5, wherein said step of assigning the determined layer manufacturing throughput times in at least two groups, and combining information relating to at least one of the shortest layer manufacturing throughput times in one of said at least two groups, with information relating to at least one of the shortest layer manufacturing throughput times in another one of said at least two groups is repeated.

7. The method according to claim 2, wherein said information comprises information relating to at least the respective solidifying device allocation.

8. The method according to claim 2, wherein said plurality of solidifying devices are arranged for emitting a beam of electromagnetic radiation, wherein, during said step of calculation allocated part manufacturing times, said calculating takes into account at least one of:
 a wavelength of said beam of electromagnetic radiation;
 a geometry of said beam of electromagnetic radiation at said layer;
 a power level of said beam of electromagnetic radiation; and
 a velocity of said beam of electromagnetic radiation along said layer.

9. The method according to claim 2, wherein, during said step of defining allocations, said parts of said layer are at least partly overlapping.

10. The method according to claim 2, wherein, during said step of defining allocations, said layer is at least divided into a contour part comprising a contour of said layer corresponding to an outer layer of said manufactured object and a fill part.

11. The method according to claim 2, wherein the method steps of defining allocations, calculating, determining and selecting are executed for at least two layers of said stacked layers, preferably for each layer of said stacked layers.

12. The method according to claim 2, wherein the step of optimizing is repeated until a desired threshold value is obtained.

13. The method according to claim 1, wherein, during said step of selecting, the shortest layer manufacturing throughput time is selected as said definite allocation.

14. A data processing unit configured to execute the method according to claim 1.

15. An apparatus for producing an object by means of additive manufacturing using the method according to claim 1, said apparatus comprising:
 a process chamber for receiving on a build surface of a build plate a bath of said material;
 a support for positioning said build plate in relation to a surface level of said bath of said material in said process chamber;
 a plurality of solidifying devices arranged for delivering a plurality of beams of electromagnetic radiation for solidifying said material; and
 a data processing unit.

* * * * *